United States Patent

Otsuka et al.

(10) Patent No.: US 9,403,957 B2
(45) Date of Patent: Aug. 2, 2016

(54) SEALING MATERIAL

(75) Inventors: Masaru Otsuka, Yokohama (JP); Katsuya Seki, Yokohama (JP); Tomohiro Yamamoto, Yokohama (JP); Youhei Takeda, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/384,140

(22) PCT Filed: Jul. 14, 2010

(86) PCT No.: PCT/JP2010/061863
§ 371 (c)(1),
(2), (4) Date: Jan. 13, 2012

(87) PCT Pub. No.: WO2011/007788
PCT Pub. Date: Jan. 20, 2011

(65) Prior Publication Data

US 2012/0123003 A1    May 17, 2012

(30) Foreign Application Priority Data

Jul. 14, 2009    (JP) .................................. 2009-165230

(51) Int. Cl.
*C08J 9/10* (2006.01)
*C08J 3/24* (2006.01)
(Continued)

(52) U.S. Cl.
CPC .. *C08J 9/103* (2013.01); *C08J 3/24* (2013.01); *C08L 23/16* (2013.01); *C09K 3/10* (2013.01); *C08J 2323/16* (2013.01); *C08J 2400/22* (2013.01); *C08J 2423/08* (2013.01);
(Continued)

(58) Field of Classification Search
CPC ..................................................... C08J 2323/16
USPC ..................................................... 521/89, 120
See application file for complete search history.

(56) References Cited

U.S. PATENT DOCUMENTS 5,932,659 A    8/1999    Bambara et al.
2004/0138321 A1*    7/2004    Hashimoto et al. ........... 521/134
(Continued)

FOREIGN PATENT DOCUMENTS

JP    54-125262 A    9/1979
JP    03-095238 A    4/1991
(Continued)

OTHER PUBLICATIONS

"Thermal Properties of Elvax measured by differential scanning calorimeter" by Dupont. Sep. 9, 2005. p. 1-4. Available online at: http://www.dupont.com/industrial-polymers/elvax/H-49653-1/H-49653-1.html.*
(Continued)

*Primary Examiner* — Mike M Dollinger
*Assistant Examiner* — Christina Wales
(74) *Attorney, Agent, or Firm* — Sughrue Mion, PLLC

(57) ABSTRACT

A sealing material is provided, which maintains excellent sealing property for a long period of time. The sealing material of the invention is characterized by being prepared by vulcanizing and foaming a mixture containing a rubber component containing a copolymer rubber of ethylene, an α-olefin having 3 or more carbon atoms, and a non-conjugated diene, a vulcanizing agent, and a blowing agent, wherein the mixture contains a thermoplastic resin having a melting point of 80° C. or less.

9 Claims, 2 Drawing Sheets

(51) Int. Cl.
*C08L 23/16* (2006.01)
*C09K 3/10* (2006.01)
C08K 5/00 (2006.01)
C08K 5/23 (2006.01)
C08L 23/08 (2006.01)

(52) U.S. Cl.
CPC ............... *C08K5/0025* (2013.01); *C08K 5/23* (2013.01); *C08L 23/0853* (2013.01); *C08L 2203/14* (2013.01); *C08L 2312/00* (2013.01); *C09K 2200/0208* (2013.01); *C09K 2200/0405* (2013.01); *C09K 2200/062* (2013.01); *C09K 2200/0622* (2013.01); *C09K 2200/0642* (2013.01)

(56) References Cited

U.S. PATENT DOCUMENTS

2006/0149005 A1* 7/2006 Minaba ........................... 526/72
2009/0246498 A1* 10/2009 Deiss ............................. 428/220
2012/0077016 A1* 3/2012 Yamamoto ............. C08J 9/0023
428/304.4

FOREIGN PATENT DOCUMENTS

| JP | 2000-001558 A | 1/2000 |
| JP | 2000-313762 A | 11/2000 |
| JP | 2001-064429 A | 3/2001 |
| JP | 2002-030171 A | 1/2002 |
| JP | 2002-212328 A | 7/2002 |
| JP | 2003-049156 A | 2/2003 |
| JP | 2003-301080 A | 10/2003 |
| JP | 2009-084506 | 4/2009 |
| JP | 2009074014 A * | 4/2009 |

OTHER PUBLICATIONS

Kipp, Dale O. (2004; 2010). "Overview—Ethylene Vinyl Acetate Copolymer (EVA), Adhesive/Sealant Grade" In Plastic Material Data Sheets. MatWeb, LLC. Online version available at: http://www.knovel.com/web/portal/browse/display?_EXT_KNOVEL_DISPLAY_bookid=1023&VerticalID=0.*

Extended European Search Report issued Nov. 6, 2012 in European Patent Application No. 10799846.0 to Bridgestone Corporation.

Exxon: "ExxonMobil Escorene LD-740", Aug. 3, 1999, XP55042400, retrieved from the internet: URL:http://www.matweb.com.

* cited by examiner

SEALING MATERIAL

CROSS REFERENCE TO RELATED APPLICATION

This application is a National Stage of International Application No. PCT/JP2010/061863, filed on Jul. 14, 2010, claiming priority based on Japanese Patent Application No. 2009-165230, filed Jul. 14, 2009, the contents of all of which are incorporated herein by reference in their entirety.

FIELD OF THE INVENTION

The present invention relates to a sealing material to be provided between members for sealing a gap between the members, and particularly relates to a sealing material comprising ethylene-α-olefin-diene copolymer rubber foam.

BACKGROUND ART

Hitherto, a gap between members formed in constructs such as buildings, vehicles, electronic devices is filled with a sealing material, to provide water cut-off, heat insulation and sound absorption. Foams made of synthetic resins or rubbers are used for the sealing materials. The foams have appropriate repulsive force (compression stress). Therefore, the foams adhere, due to compliance, to the irregularity on the surface of the members to be sealed, under application of small compression deformation. Accordingly, an excellent seal property can be attained.

Above all, a rubber foam obtained by expanding ethylene-α-olefin-diene copolymer rubber foam by using a blowing agent such as azodicarboxylic amide is preferably used as a sealing material, because of excellent weather resistance, heat resistance and seal properties (Patent Literature 1 and 2). In the rubber foam, small cell diameter, appropriate expansion ratio and compression stress are effective for improving the properties required to the foam (water cut-off property, heat insulation property, sound absorption property, etc). Therefore, the rubber foam is subjected to bubble control by use of a treatment/processing auxiliary such as stearic acid.

PRIOR ART LITERATURE

Patent Literature

Patent Literature 1: JP-A 2000-313762
Patent Literature 2: JP-A 2001-64429

DISCLOSURE OF THE INVENTION

Problems to be Solved by the Invention

However, the sealing material obtained by using a conventional rubber foam has a problem of decreasing sealing property, due to the time dependent decrease of the compression stress. This problem easily happens, particularly when the sealing material is used at high temperatures for a long time or subjected to a long-term use under an environment where a high temperature and a low temperature are repeatedly observed.

It is therefore an object of the present invention to provide a sealing material which maintains excellent sealing properties for a long time.

Means for Solving the Problems

The above problem of the present invention is solved by a sealing material prepared by vulcanizing and foaming a-mixture comprising a rubber component comprising a copolymer rubber of ethylene, an α-olefin having 3 or more carbon atoms and a non-conjugated diene, a vulcanizing agent, and a blowing agent, wherein the mixture comprises a thermoplastic resin having a melting point of 80° C. or less.

Effect of the Invention

The sealing material of the present invention comprising a thermoplastic resin having a melting point of 80° C. or less helps to increase an adhesion property, as time elapses. Therefore, the adhesion between a surface of the sealing material and a surface to be sealed is further improved. As a result, the sealing material maintains excellent sealing properties for a long time.

EMBODIMENT FOR CARRYING OUT THE INVENTION

Figure 1:
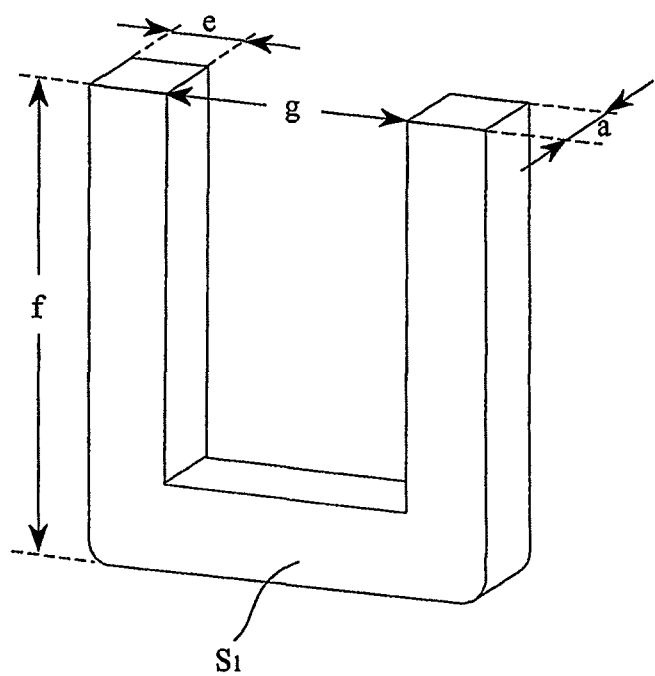
FIG. 1 is a perspective view of a U-shaped sample to be used for evaluating water cut-off property.

The sealing material of the invention is prepared by vulcanizing and foaming a mixture comprising a rubber component comprising a copolymer rubber of ethylene, an α-olefin having 3 or more carbon atoms, and a non-conjugated diene, a vulcanizing agent, a blowing agent, and a thermoplastic resin having a melting point of 80° C. or less.

The thermoplastic resin having a melting point of 80° C. or less bleeds out, as the time elapses, to the surface of the sealing member. Therefore, adhesion is obtained on the surface of the sealing material with respect to a surface to be sealed. Further, repulsive force of the sealing material further helps to increase the adhesion between the surface of the sealing material and the surface to be sealed. The bleeding out of the thermoplastic resin is promoted particularly at a high temperature of 60° C. or more. Therefore, even after the sealing material deteriorates to have a lower compression stress, it is possible to maintain adhesion between the sealing material and the surfaces to be sealed, and hence the sealing material can maintain an excellent sealing property for a long time. At the point of time where the sealing material is installed, the thermoplastic resin has not yet bled. Therefore, the position of the sealing material can be easily adjusted at the installation at the installation. In other words, it is possible to maintain a good working property. Moreover, the sealing material of the present invention is excellent in terms of productivity, since there is no need to further provide, on the surfaces of the rubber foam, an adhesive agent layer or the like for improving the adhesion with respect to surfaces to be sealed.

The sealing material comprising a conventional rubber foam may include a thermoplastic resins such as EVA, for increasing the strength of the sealing material. However, it is considered for the known material that bleeding out of the components included in the sealing material is not desirable. Therefore, the thermoplastic resin included in the conventional rubber foam, in general, has a melting point exceeding 80° C., which fails to attain the above-discussed effect of the present invention.

[Thermoplastic Resin]

The thermoplastic resin has a melting point of 80° C. or less, preferably in the range of 50 to 75° C., and particularly preferably in the range of 60 to 70° C.

The melting point of the thermoplastic resin is a value measured by differential scanning calorimetry (DSC) pursuant to JIS K6924-2.

Examples of the thermoplastic resin having a melting point of 80° C. or less are low density polyethylene, ethylene-vinyl acetate copolymer resin, ethylene-acrylic acid copolymer resin, ethylene-ethyl acrylate copolymer resin, ethylene-methyl acrylate copolymer resin, and ethylene-methacrylic acid copolymer resin. Among these resins, ethylene-vinyl acetate resin (EVA) is particularly preferable. EVA exhibits an excellent adhesion property without staining a material to be sealed when EVA bleeds out with respect to the surface of the material. Moreover, EVA further increases the durability of the sealing material. In addition to the above, EVA has a water repellent property, and also helps to form a film/coating on the surface of the sealing material. Accordingly, it is possible to improve water cut-off sealing property of the sealing material by using EVA.

EVA, which has a melting point of 80° C. or less and is capable of bleeding out to the surface of the sealing material, preferably has an appropriate melt flow rate (MFR) and vinyl acetate content.

Ethylene-vinyl acetate copolymer has a melt flow rate, preferably in the range of 1 to 2500 g/10 min. When the melt flow rate of EVA is greater than 2500 g/10 min, the sealing material has a poor adhesion, and the water cut-off properties are sometimes lowered. When the melt flow rate of EVA is smaller than 1 g/10 min, a film which is effective for water cut-off is not easily prepared, and the water cut-off properties of EVA are sometimes decreased. It is further preferable that the melt flow ratio of EVA is in the range of 10 to 500 g/10 min, and particularly preferable in the range of 30 to 400 g/10 min. The above-discussed MFR values of EVA are measured in compliance with JIS K6924-1, under the condition at 190° C. and a load application of 21.18N.

Ethylene-vinyl acetate copolymer has a vinyl acetate content, preferably in the range of 10 to 50 wt. %. When the vinyl acetate content in EVA is increased, the rubber elasticity, flexibility and adhesion are improved On the other hand, when the vinyl acetate content in EVA is excessively large, the adhesion becomes too large, and the handling property of EVA is deteriorated, and hence the working/processing characteristics are sometimes decreased. It is more preferable that EVA has vinyl acetate content in the range of 15 to 35 wt. %, and particularly preferable in the range of 25 to 35 wt %. Herein, the vinyl acetate content of EVA is measured in compliance with JIS K 6924.

It is preferable that the content of the thermoplastic resin is in the range of 1 to 40 parts by weight, particularly in the range of 10 to 30 parts by weight, based on 100 parts by weight of the rubber component. When the content of the thermoplastic resin exceeds 40 parts by weight, it is possible that kneading property and formability are lowered, the cells enlarge, and that the compression stress of the foam is decreased. When the content of the thermoplastic resin is less than 1 part by weight, it is possible that the thermoplastic resin cannot bleed out sufficiently.

[Rubber Component]

The rubber component comprises at least ethylene-α-olefin-diene copolymer rubber. The ethylene-α-olefin-diene copolymer rubber is a copolymer of ethylene, an α-olefin and a non-conjugated diene.

As α-olefins, those having 3 or more carbon atoms. Specific examples include propylene, 1-butene, 4-methyl-1-pentene, 1-hexene, 1-octene, 1-decene, 1-dodecene, 1-tetradecene, 1-hexadecene, 1-octadecene, and 1-eicocene. The use of propylene is particularly preferable.

As the non-conjugated diene, it is possible to use 1,4-hexadiene, 1,6-octadiene, 1,7-octadiene, 1,8-nonadiene, 1,9-decadiene, 2-methyl-1,5-hexadiene, 6-methyl-1,5-hexadiene, 7-methyl-1,6-octadiene, cyclohexadiene, dicyclopentadiene, methylterahydroindene, 5-vinyl-2-norbornene, 5-ethylidene-2-norbornene, and 5-methylene-2-norbornene. Among these materials, 5-ethylidene-2-norbornene is preferably used.

Ethylene-α-olefin-diene copolymer rubber is preferably ethylene-propylene-diene copolymer rubber (EPDM). The non-conjugated diene content in the EPDM is preferably in the range of 3 to 20% by weight, particularly in the range of 5 to 15% by weight. The application of the EPDM helps to restrict the lowering of the compression stress of the sealing material, as time elapsed.

Ethylene-α-olefin-diene copolymer rubber is included in the rubber component, preferably in an amount of 60% by weight or more, particularly 85% by weight or more, based on the total weight of the rubber component. Accordingly, it is possible to prevent from the sealing material having a compression stress being lowered, as time elapsed.

As a rubber component used in addition to the ethylene-α-olefin-diene copolymer rubber, ethylene-propylene rubber (EPM), butyl rubber (IIR), isoprene rubber (IR), natural rubber (NR), styrene-butadiene rubber (SBR), butadiene rubber (BR), 1,2-polybutadiene (RB), acrylic rubber (ACM, ANM), chlorosulfonatd polyethylene (CSM), chloropropylene (CR), silicone rubber or the like can be used. Among these, EPM, and IIR are preferably used.

[Vulcanizing Agent]

Examples of the vulcanizing agent are sulfur, sulfur compound, zinc flower, selenium, magnesium oxide, and organic peroxide. With the heat stability of the foam and the durability of the sealing material taking into account, the use of at least sulfur is preferable.

The content of the vulcanizing agent is preferably in the range of 1 to 30 parts by weight particularly in the range of 5 to 20 parts by weight, based on 100 parts by weight of the rubber component.

In the present invention, the term "vulcanization" is not understood to be limited to bridging by using sulfur, but is used as a synonym of "crosslinkage".

[Blowing Agent]

A blowing agent is used not only for gas generation for foaming, but also used for vulcanization control with respect to the rubber component. Examples of the blowing agent include dinitropentamethylenetetramine (DPT), azodicarbonamide (ADCA), 4,4'-oxybisbenzenesulfonylhydrazide (OBSH), and sodium bicarbonate. Among these materials, ADCA is particularly preferably used, with the heat resistance of the foam, and the durability of the sealing material taking into account.

It is preferable that the content of the blowing agent is in the range of 5 to 40 parts by weight, particularly in the range of 10 to 30 parts by weight, based on 100 parts by weight of the rubber component.

[Others]

The mixture used for the sealing material of the present invention may include a further additive, depending on the object. For instance, a vulcanization promoter such as thiazole promoter, dithiocarbamate promoter, thiourea promoter dithiophosphite promoter, and thiurum-based vulcanization promoting agent, a vulcanization promoting auxiliary such as stearic acid, lauric acid, and zinc oxide (activated zinc flower) are used.

It is also possible to use a resin softener such as paraffin oil, paraffin wax, blow asphalt, polybutene, or rosin; a filler such as calcium carbonate, magnesium carbonate, silicic acid or silicic acid salts, talk, clay, mica flour, bentonite, carbon black, silica, aluminum hydroxide, magnesium hydroxide, alumina, aluminum silicate, acetylene black, aluminum flour, ceramic, glass fiber, wood flour, or waste textile; dehydrating agent such as potassium oxide, cesium oxide, sodium oxide, calcium oxide, and blowing auxiliary such as urea and urea derivatives, and anti-aging agent, antioxidant, pigment, coloring agent, and anti-mold agent, etc. One or more of these additives can be added to the mixture, if necessary. Carbon black can be used also as a reinforcement agent.

Among the above-mentioned substances, a resin softener is preferably used, since a sealing material, which has excellent mechanical strength and excellent adhesion with respect to a surface to be sealed, can be obtained by the use. The content of the resin softener is preferably in the range of 50 to 100 parts by weight, based on 100 parts by weight of the rubber component.

[Preparation Method]

For preparing a sealing material according to the present invention, the above-explained mixture kneaded and formed to have a desired shape, and the thus obtained form is vulcanized and foamed. Accordingly, a sealing material is obtained, which has a closed cell structure.

For preparing the sealing material, the mixture of the invention is kneaded, which has not yet include a blowing agent, blowing auxiliary, vulcanizing agent, and vulcanization auxiliary. The kneading is carried out by use of Banbury mixer, kneader, an enclosed mixer such as Intermix, or an open mixer such as rolls. It is preferable to perform the kneading at a temperature in the range of 80 to 170° C., particularly at a temperature in the range of 90 to 140° C., for 2 to 20 minutes. After kneading, a blowing agent, a blowing auxiliary, a vulcanization agent, and a vulcanizing auxiliary are added to the kneaded mixture, and the resultant mixture is further kneaded. The kneading is performed preferably at a temperature in the range of 40 to 90° C., particularly at a temperature in the range of 50 to 80° C. for 5 to 30 minutes. The thus obtained kneaded mixture is formed to have a desired shape such as a sheet shape by a calender machine, or an extruder, etc.

The kneaded substance is formed to have a desired shape, and then introduced to a vulcanization apparatus. The kneaded substance is heated at a temperature in the range of 130 to 270° C., in particular at a temperature in the range of 140 to 200° C. for 1 to 90 minutes to vulcanize and foam the same. In accordance with this treatment, a foam having a closed cell structure is obtained. Heat application is carried out in a vulcanization vessel, by using heat application means such as a hot air vulcanizing vessel (HAV), glass beads fluidized bed, microwave vulcanization machine (UHF), or steam. Herein, vulcanization and foaming can be carried out simultaneously, or successively under different temperature conditions.

In vulcanization and foaming, it is preferable to set the expansion ratio of the rubber foam (density ratio of the mixture before and after foaming) having a closed cell structure in the range of 5 to 30 times, particularly in the range of 10 to 20 times, based on the original size. Accordingly, a rubber foam with a appropriate mechanical strength is obtained.

The rubber foam, which has been prepared by the vulcanization and foaming, has a closed cell structure. The cells in the rubber foam having a closed cell structure are fine/minute, to give the rubber foam with a high density. Accordingly, a sealing material having excellent properties such as water cut-off property, sound insulation property, and heat insulation property can be obtained.

The mean diameter of the cell in the sealing material is in the range of 125 to 2500 µm, particularly in the range of 167 to 500 µm. The above-mentioned mean diameter of the cell is a value measured in accordance with ASTM D 3576-77.

The number of the cell in the sealing material is in the range of 10 to 200/25 mm, in particular in the range of 50 to 150/25 mm. Here, the number of the cell is defined as that prescribed in JIS K 6767(1999), namely, based on the number of the cell per 25 mm of the foam.

The rubber foam with a closed cell structure has 50% compression stress in a thickness direction of the foam at 25° C. in the range of 0.5 to 100 kPa, particularly in the range of 45 to 70 kPa. Here, 50% compression stress is a value measured pursuant to JIS K6767.

Moreover, the sealing material has a density (weight/volume), in the range of 50 to 150 kg/m$^3$, particularly in the range of 90 to 110 kg/m$^3$. The sealing material has a low density because the fine cells are highly dispersed therein, which means that the sealing material is excellent in view of cost performance. Here, the density is a value measured pursuant to a method prescribed in JIS K7222.

Moreover, the sealing material has a tensile strength of 300% elongated in a longitudinal direction of the foam in the range of 50 to 500 kPa, particularly in the range of 200 to 300 kPa. Here, the tensile strength is a value measured pursuant to JIS K6767 (A method).

The sealing material of the present invention has an ability of maintaining an excellent adhesion for a long time between the surface of the rubber foam and surfaces to be sealed. Such effect is particularly obtained in the use at high temperatures (60° C. or more) for a long time, or in the use for a long time under an environment where a high temperature (60° C. or more) and a low temperature (30° C. or less) are repeatedly observed. For sealing gaps between members, the sealing material is preferably applicable, for instance, to a window-dam in vehicles; electric installations such as air-conditioner, washing machine, refrigerator, and vending machine; audio equipments; outer wall joint, sash, roof joint parts in architecture; housing equipment such as kitchen apparatus, modular bath, and water heater; joint in structures, roads or bridges or joint part of waterway in construction work.

Moreover, the sealing material is used for dust-proof, heat insulation, sound insulation, vibration-proof, shock absorption, watertight, and airtight purposes. For instance, the sealing material can be used as a dust-proof material, a heat insulator, a sound insulator, a vibration insulator, a shock absorber, and a filler. The thickness of the sealing material can be decided depending on the usage, preferably in the range of 3 to 50 mm.

EXAMPLES

The present invention will now be explained by referring to Examples. The present invention is not restricted to the following Examples.

Example 1

In the formulation of a mixture shown in Table 1, the components in the mixture except for a blowing agent, a blowing auxiliary, a vulcanizing agent and a vulcanization promoter were mixed by a kneader at 120° C. for 8 minutes.

Subsequently, the kneaded mixture was left to cool to have a surface temperature of 20° C., to which a blowing agent, a blowing auxiliary, a vulcanizing agent and a vulcanization promoter were further added, and kneaded at 80° C. for 5 minutes by a kneader. Then, the resultant kneaded mixture was formed to have a sheet form, through an extruder for rubbers. The formed mixture was introduced to a heating furnace, and vulcanized and expanded at 140° C. for 80 minutes, whereby a sealing material of a rubber foam having a closed cell structure was obtained.

Following is the details of EPDM and EVA1 in the formulation in Table 1. Detailed description for the other components will be omitted.

EPDM (Commercial name 501A, manufactured by Sumitomo Chemical Company, Limited; ethylene content: 52% by weight, diene (5-ethylidene-2-norbornene) content: 5% by weight)

EVA1 (melting point: 71° C.; melt flow rate: 18 g/10 min; vinyl acetate content: 28 wt. %)

Examples 2 to 6

A sealing material of a rubber foam with a closed cell structure was prepared in the same way as in Example 1, except that the formulation was changed as shown in Table 1. The details of EVA 2 to EVA 4 in Table 1 are as follows.

EVA2 (melting point: 67° C.; melt flow rate 400 g/10 min; vinyl acetate content: 28 wt. %)

EVA3 (melting point: 66° C.; melt flow rate 30 g/10 min; vinyl acetate content: 32 wt. %)

EVA4 (melting point: 79° C.; melt flow rate 2500 g/10 min; vinyl acetate content: 14 wt. %)

Comparative Example 1

A sealing material of a rubber foam with a closed cell structure was prepared in the same way as in Example 1, except that the formulation was changed as shown in Table 2. Subsequently, a cell breakage treatment was carried out with respect to the rubber foam having a close cell structure, by subjecting the rubber foam to roll crashing. Therefore, a sealing material of a rubber foam having a semi-open cell structure was obtained.

Comparative Examples 2 to 3

A sealing material of a rubber foam with a closed cell structure was prepared in the same way as in Example 1, except that the formulation was changed as shown in Table 2.

Comparative Example 4

A sealing material of a rubber foam with a closed cell structure was prepared in the same way as in Example 1, except that EVA was not used. Subsequently, EVA1 (melting point: 71° C.; melt flow rate: 18 g/10 min; vinyl acetate content: 28 wt. %) was fused by the application of heat at 80° C. thereto for 30 min, coated to the surface of the rubber foam by use of a bar coater, and died at 20° C. for 60 min. It was not possible, however, to form an EVA coating which is capable of being evaluated on water cut-off properties.

Comparative Example 5

A sealing material of a rubber foam with a closed cell structure was prepared in the same way as in Example 1, except that the formulation was changed as shown in Table 2. The details of EVA 5 in Table 2 are as follows.

EVA5 (melting point: 90° C.; melt flow rate 14 g/10 min; vinyl acetate content: 15 wt. %)

[Evaluation]

1. Density

The density of the sealing material was measured by using a thickness gauge (Dial thickness gauge, manufactured by Teclock) and a balance (digital balance, manufactured by Shimadzu Corporation), pursuant to JIS K 7222. The results are shown in Table 3.

2. The Number of Cells in the Sealing Material was Measured in Accordance with JIS K 6767(1999). The Results are Shown in Table 3.

3. 50% Compression Stress

50% compression stress of the sealing material in the thickness direction was measured pursuant to a method JIS K 6767 (1999) by using a rigidity tester (Autograph, manufactured by Shimadzu Corporation). The results are shown in Table 3.

4. Water Cut-Off Property

Figure 2:
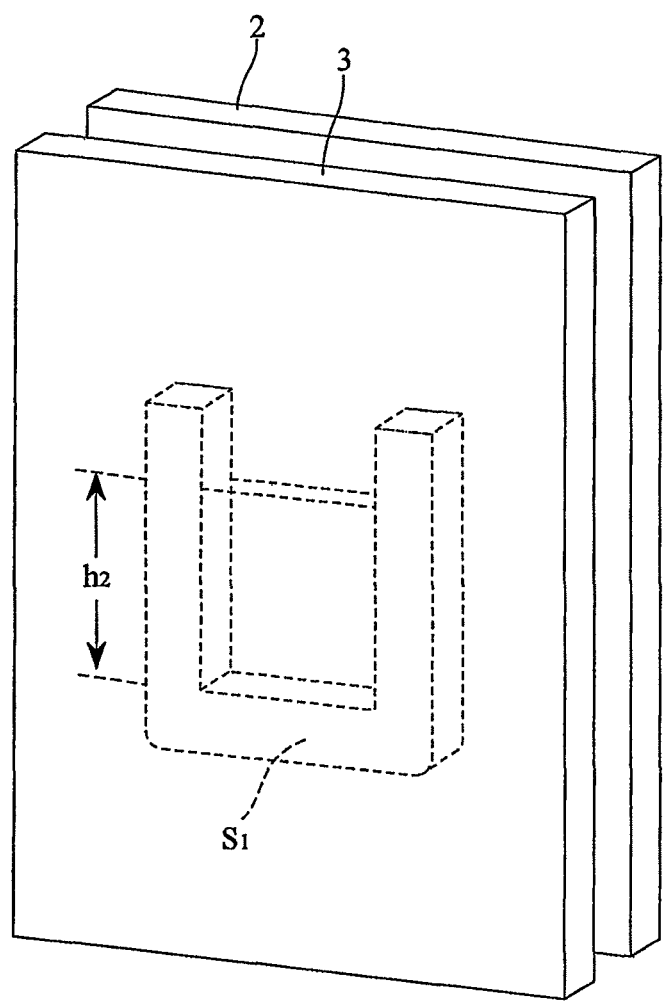
FIG. 2 is a diagram for generally explaining U-shaped test method for evaluating water cut-off property.

The sealing material was punched out to obtain a sample $S_1$ in the form of a U shape, as shown in FIG. 1, which has a thickness (a) of 10 mm, a width (e) of 10 mm, a height (f) of 130 mm, and an interval (g) between free ends of the sample of 45 mm. The sample $S_1$ was subjected to 60% compression in the thickness direction of the sample by using two acrylic boards 2 and 3 as shown in FIG. 2. Water was poured to the inside of the U shape to the level of 100 mm. The time period by when water leakage was observed was measured. The results are shown in Table 3.

5. Water Cut-Off Property After Heat Resistant Test

The water cut-off property of the sealing material was evaluated, as in the same way as above, after the sealing material was left under an environment at 80° C., 0% RH for 24 hours. The results are shown in Table 3. In table 3, "⊚", "○" and "×" represent the following states.

⊚: No water leakage was observed for 24 hours or more.

○: No water leakage was observed for 8 hours or more.

×: Water leakage was observed within 8 hours.

TABLE 1

| | | | Example 1 | Example 2 | Example 3 | Example 4 | Example 5 | Example 6 |
|---|---|---|---|---|---|---|---|---|
| Formulation [parts by weight] | Rubber component | EPDM | 100 | 100 | 100 | 100 | 100 | 100 |
| | Thermoplastic resin | EVA1 | 5 | 10 | 30 | 0 | 0 | 0 |
| | | EVA2 | 0 | 0 | 0 | 10 | 0 | 0 |
| | | EVA3 | 0 | 0 | 0 | 0 | 10 | 0 |
| | | EVA4 | 0 | 0 | 0 | 0 | 0 | 10 |
| | blowing agent | azodicarbonamide | 20 | 20 | 20 | 20 | 20 | 20 |
| | blowing auxiliary | urea | 1 | 1 | 1 | 1 | 1 | 1 |
| | vulcanizing agent | sulfur | 1.35 | 1.05 | 1.05 | 1.35 | 1.35 | 1.35 |

TABLE 1-continued

|  |  | Example 1 | Example 2 | Example 3 | Example 4 | Example 5 | Example 6 |
|---|---|---|---|---|---|---|---|
| vulcanization auxiliary | stearic acid | 4 | 4 | 4 | 4 | 4 | 4 |
| filler | carbon black(SFR) | 20 | 20 | 20 | 20 | 20 | 20 |
|  | calcium carbonate | 150 | 150 | 150 | 150 | 150 | 150 |
| resin softener | paraffin wax | 6 | 6 | 6 | 6 | 6 | 6 |
|  | paraffin oil | 65 | 65 | 65 | 65 | 65 | 65 |
| vulcanization promoter | thiazole | 0.5 | 0.5 | 0.5 | 0.5 | 0.5 | 0.5 |
|  | dithiocarbamate | 2.0 | 1.5 | 1.5 | 2.0 | 2.0 | 2.0 |
|  | thiourea | 0.5 | 0.5 | 0.5 | 0.5 | 0.5 | 0.5 |
|  | dithiophosphite | 1.0 | 0 | 0 | 1.0 | 1.0 | 1.0 |
| vulcanization promoting auxiliary | activated zinc flower | 5.0 | 5.0 | 5.0 | 5.0 | 5.0 | 5.0 |
| dehydrating agent | calcium oxide | 8.0 | 8.0 | 8.0 | 8.0 | 8.0 | 8.0 |
| Addition method of thermoplastic resin |  | internally added | internally added | internally added | internally added | internally added | internally added |
| Cellular structure of rubber foam |  | closed cell | closed cell | closed cell | closed cell | closed cell | closed cell |

TABLE 2

|  |  |  | Comparative Example 1 | Comparative Example 2 | Comparative Example 3 | Comparative Example 4 | Comparative Example 5 |
|---|---|---|---|---|---|---|---|
| Formulation [parts by weight] | rubber component | EPDM | 100 | 100 | 100 | 100 | 100 |
|  | Thermoplastic resin | EVA1 | 0 | 0 | 0 | (20) | 0 |
|  |  | EVA5 | 0 | 0 | 0 | 0 | 10 |
|  | blowing agent | azodicarbonamide | 15.9 | 17 | 17 | 20 | 20 |
|  | blowing auxiliary | urea | 3.5 | 3.5 | 2.5 | 1 | 1 |
|  | vulcanizing agent | sulfur | 1.05 | 1.05 | 1.05 | 1.35 | 1.35 |
|  | vulcanization auxiliary | stearic acid | 1.5 | 4 | 3 | 4 | 4 |
|  | filler | carbon black (SFR) | 20 | 20 | 20 | 20 | 20 |
|  |  | calcium carbonate | 150 | 150 | 150 | 150 | 150 |
|  | resin softener | paraffin wax | 6 | 6 | 6 | 6 | 6 |
|  |  | paraffin oil | 65 | 65 | 65 | 65 | 65 |
|  | vulcanization promoter | thiazole | 1.5 | 1.5 | 0.5 | 0.5 | 0.5 |
|  |  | dithiocarbamate | 0.9 | 1.2 | 1.5 | 2.0 | 2.0 |
|  |  | thiourea | 0.4 | 0.5 | 0.5 | 0.5 | 0.5 |
|  |  | dithiophosphite | 0.8 | 1.0 | 1.0 | 1.0 | 1.0 |
|  | vulcanization promoting auxiliary | activated zinc flower | 5.0 | 5.0 | 5.0 | 5.0 | 5.0 |
|  | dehydrating agent | calcium oxide | 5.0 | 5.0 | 8.0 | 8.0 | 8.0 |
| Addition method of thermoplastic resin |  |  | — | — | — | coated | internally added |
| Cellular structure of rubber foam |  |  | semi-open cell | closed cell | closed cell | closed cell | closed cell |

TABLE 3

|  | Characteristics of Sealing Material | | | Water Cut-Off property of Sealing Material | |
|---|---|---|---|---|---|
|  | density [Kg/m$^3$] | number of foams [number/25 mm] | 50% compression stress [kPa] | Before heat resistant test (60% 100 mm water height) | After heat resistant test (60% 100 mm water height) |
| Example 1 | 105 | 91 | 62 | ◎ | ○ |
| Example 2 | 102 | 80 | 58 | ◎ | ○ |
| Example 3 | 105 | 72 | 59 | ◎ | ◎ |
| Example 4 | 106 | 78 | 60 | ◎ | ◎ |
| Example 5 | 104 | 75 | 58 | ◎ | ◎ |
| Example 6 | 105 | 77 | 60 | ◎ | ○ |
| Comparative Example 1 | 98 | 29 | 10 | X | X |
| Comparative Example 2 | 121 | 54 | 69 | ○ | X |
| Comparative Example 3 | 113 | 85 | 59 | ◎ | X |
| Comparative Example 4 | — | — | — | — | — |
| Comparative Example 5 | 108 | 75 | 70 | X | X |

As shown in Table 3, the sealing material of Examples 1 to 6 maintained high adhesion between the surfaces of the rubber foam and the acrylic boards and excellent water cut-off properties, even after being left under the high temperature environment.

EXPLANATION OF REFERENCE NUMERALS

S₁ U-shaped sample
2, 3 Acrylic boards

The invention claimed is:

1. A sealing material prepared by vulcanizing and foaming a mixture comprising ethylene-propylene-diene copolymer rubber as a rubber component, a vulcanizing agent, a blowing agent, a vulcanization promoting auxiliary, and a dehydrating agent, wherein the mixture comprises a thermoplastic resin having a melting point of 80° C. or less, stearic acid as the vulcanization promoting auxiliary, and calcium oxide as the dehydrating agent, the sealing material having a density in the range of 90 to 150 kg/m³ measured in accordance with JIS K 7222, wherein the thermoplastic resin is an ethylene-vinyl acetate copolymer, the ethylene-vinyl acetate copolymer is contained in the range of 5 to 40 parts by weight, based on 100 parts by weight of the rubber component, the ethylene-vinyl acetate copolymer has a melt flow rate in the range of 18 to 2500 g/10 min., and the ethylene-vinyl acetate copolymer has a vinyl acetate content in the range of 25 to 35 wt %, wherein the vulcanizing agent is contained in the range of 1 to 30 parts by weight, based on 100 parts by weight of the rubber component, and wherein the sealing material has an expansion ratio in the range of 5 to 30 and a cell number in the range of 50 to 150/25 mm, and the sealing material has a closed cell structure.

2. The sealing material as claimed in claim 1, wherein the vulcanizing agent consists essentially of sulfur.

3. The sealing material as claimed in claim 1, wherein the blowing agent is azodicarboxylic amide.

4. The sealing material as claimed in claim 1, wherein the sealing material has a density in the range of 90 to 110 kg/m³ measured in accordance with JIS K 7222.

5. The sealing material as claimed in claim 1, wherein the sealing material comprises a film of ethylene-vinyl acetate copolymer resin (EVA) on the surface thereof.

6. The sealing material as claimed in claim 1, wherein a melt flow rate of the ethylene-vinyl acetate copolymer is in the range of 18 to 500 g/10 min.

7. The sealing material as claimed in claim 4, wherein the sealing material has a density in the range of 102 to 110 kg/m³.

8. The sealing material as claimed in claim 1, wherein the sealing material has a water cut-off property that is maintained upon exposure to heat.

9. The sealing material as claimed in claim 1, wherein the vulcanizing agent consists of sulfur.

* * * * *